US008526321B2

(12) United States Patent
Li et al.

(10) Patent No.: US 8,526,321 B2
(45) Date of Patent: Sep. 3, 2013

(54) METHOD AND DEVICE FOR DETECTING OF TRANSMITTING ANTENNA CONFIGURATION IN LONG TERM EVOLUTION SYSTEM

(75) Inventors: Yan Li, Guangdong Province (CN); Zisheng Cao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 85 days.

(21) Appl. No.: 13/258,451

(22) PCT Filed: May 28, 2010

(86) PCT No.: PCT/CN2010/073344
§ 371 (c)(1),
(2), (4) Date: Nov. 17, 2011

(87) PCT Pub. No.: WO2010/145436
PCT Pub. Date: Dec. 23, 2010

(65) Prior Publication Data
US 2012/0057488 A1   Mar. 8, 2012

(30) Foreign Application Priority Data

Sep. 28, 2009   (CN) .......................... 2009 1 0176075

(51) Int. Cl.
*G01R 31/08* (2006.01)
(52) U.S. Cl.
USPC ............ 370/252; 370/329; 455/434; 375/267
(58) Field of Classification Search
None
See application file for complete search history.

(56) References Cited

U.S. PATENT DOCUMENTS

| 2008/0037409 | A1 | 2/2008 | Ogawa et al. |
| 2009/0060088 | A1 | 3/2009 | Callard et al. |
| 2010/0054196 | A1* | 3/2010 | Hui .............................. 370/329 |

FOREIGN PATENT DOCUMENTS

CN    101222300 A    7/2008

OTHER PUBLICATIONS

International Search Report for PCT/CN2010/073344 dated Aug. 10, 2010.

* cited by examiner

*Primary Examiner* — David Oveissi
(74) *Attorney, Agent, or Firm* — Stephen Yang; Ling Wu; Ling and Yang Intellectual Property

(57) ABSTRACT

The present invention discloses a method and device for detecting transmitting antenna port configuration in a LTE system. The method includes: receiving a signal transmitted by a transmitting end at a receiving end, extracting from the signal a reference signal transmitted by each transmitting antenna port and descrambling; calculating and obtaining reference signal energy of each transmitting antenna port, dividing the reference signal energy into a first type of reference signal energy and a second type of reference signal energy, and determining a current bandwidth; and comparing the first type of reference signal energy with the second type of reference signal energy, and determining the number of transmitting antenna ports according to a comparison result. The present invention does not need to perform P-BCH blind detection multiple times to obtain the number of transmitting antenna ports, thus improving the performance of cell initial search and reducing the complexity of implementation.

18 Claims, 2 Drawing Sheets

METHOD AND DEVICE FOR DETECTING OF TRANSMITTING ANTENNA CONFIGURATION IN LONG TERM EVOLUTION SYSTEM

TECHNICAL FIELD

The present invention relates to the technical field of wireless communication, and in particular, to a method and device for detecting a transmitting antenna port configuration in a long term evolution (LTE) system.

BACKGROUND OF THE RELATED ART

In cell initial search of the LTE, it needs to demodulate a public broadcast channel (P-BCH) to obtain configuration information of the cell. The steps of demodulating the P-BCH generally include: channel estimation, multi-input multi-output (MIMO) receiving, convolutional codes decoding and cyclic redundancy check (CRC), etc. Since the P-BCH adopts a transmit diversity scheme, the number of transmitting antenna ports of a base station has three possible configurations: 1, 2, and 4 antenna ports. However, this information is unknown to a UE, the UE has to try all the three possible modes of transmit diversity schemes, and determines the transmit diversity scheme used by the base station according to the CRC in the demodulated P-BCH information.

In this way, the receiver needs to detect the P-BCH for three times at most in order to obtain the correct transmit diversity scheme, and the more times for detection is, the more power consumption of the UE is. Moreover, since the process of three demodulations needs to be performed possibly within one transmission time interval (TTI) of the P-BCH, the requirement on the detection speed is also raised by three times.

In addition, the LTE system supports six different bandwidths: 20M, 15M, 10M, 5M, 3M and 1.4M, and the UE with one bandwidth needs to support narrow-band working modes, for example, a UE with a maximum bandwidth of 20M can work in a 10M or 5M mode. When the cell initial search is performed, P-BCH signals are present in 1.4M at the middle of a frequency band, a bandwidth configuration of a transmitter can be known only after P-BCH demodulation, which means that the UE can only use the information in the bandwidth of 1.4M to perform the P-BCH demodulation. If the UE can know the system bandwidth in advance, for example, 5M or more, the UE can use information in more bandwidths. For example, the channel estimation needs to use reference signal (RS), and more RSs can be detected in the bandwidth of 5M, so this is very helpful to the performance of the channel estimation.

As mentioned above, in the cell initial search, the receiver needs to perform multiple demodulations on the P-BCH to obtain the number of the transmitting antenna ports, thus reducing the performance of the cell initial search and increasing the complexity of calculation when the receiver performs the modulation.

CONTENT OF THE INVENTION

The present invention provides a method and device for detecting a transmitting antenna port configuration in a long term evolution system to reduce the complexity of calculation of the receiver in cell initial search.

An embodiment of the present invention provides a method for detecting a transmitting antenna port configuration in a long term evolution system, comprising the following steps of:

receiving a signal transmitted by a transmitting end at a receiving end, extracting reference signals transmitted by each transmitting antenna port and descrambling the reference signal;

calculating and obtaining reference signal energy of each transmitting antenna port, dividing the reference signal energy into a first type of reference signal energy and a second type of reference signal energy, and determining a current bandwidth; and comparing the first type of reference signal energy with the second type of reference signal energy in the current bandwidth, and determining the number of transmitting antenna ports according to a comparison result.

Furthermore, the receiving end receives the signal transmitted by the transmitting end with a maximum possible bandwidth.

Furthermore, the first type of reference signal energy is reference signal energy of a first transmitting antenna port; and the second type of reference signal energy comprises: reference signal energy of a second transmitting antenna port, and reference signal energy of a third transmitting antenna port and a fourth transmitting antenna port.

Furthermore, said step of the receiving end extracting the reference signals transmitted by each transmitting antenna port from the received signal comprises:

the receiving end extracting a reference signal of a $p^{th}$ transmitting antenna port from a $m^{th}$ sub-carrier on $l^{th}$ OFDM symbol in a $t^{th}$ time slot in a sub-frame, and the reference signal of the pth transmitting antenna port $r_{p,t}(l,m)$;

wherein, p represents a transmitting antenna port index, t is a time slot index, m is a sub-carrier index, l represents the estimated index of OFDM symbol; and said step of descrambling the extracted reference signal comprises: generating a local reference signal $rs_{p,t}(l,m)$ according to a cell identity, a symbol, a time slot sequence number and a cyclic prefix mode information and based on the $\bar{r}_{p,t}(l,m)$, and descrambling: $\bar{r}_{p,t}(l,m) = r_{p,t}(l,m) \cdot rs^*_{p,t}(l,m)$.

Furthermore, said step of calculating and obtaining the reference signal energy of each transmitting antenna port comprises:

conjugate multiplying the descrambled reference signals $\bar{r}_{p,t}(l,m)$ extracted from two time slots in one sub-frame to obtain reference signal energy of the $p^{th}$ transmitting antenna port corresponding to the $m^{th}$ sub-carrier on the $l^{th}$ OFDM symbol in the time slots t and t+1: $R_p(l,m) = \bar{r}_{p,t}(l,m) \cdot \bar{r}_{p,t+1}(l,m')$;

wherein, for the first transmitting antenna port and the second transmitting antenna port: m'=m; and for the third transmitting antenna port and the fourth transmitting antenna port: m'=(m+3) mod 6.

The method further comprises:

adding all $R_p(l,m)$ of the $p^{th}$ transmitting antenna port within an available bandwidth together to obtain $$\sum^{M_l} R_p(l,m);$$

adding the $$\sum^{M_l} R_p(l,m)$$

corresponding to l OFDM symbols in one time slot together and averaging to obtain an average value $$\overline{R}_p^{M_i} = \left| \frac{\sum^{l} \sum^{M_i} R_p(l,m)}{l \Box M_i} \right|$$

of the reference signal energy of the $p^{th}$ transmitting antenna port, as the reference signal energy of the $p^{th}$ transmitting antenna port;

said $M_i$ ($i=0, 1, \ldots, 5$) is the number of sub-carriers containing the reference signal within the available bandwidth, $M=\{12, 30, 50, 100, 150, 200\}$.

Furthermore, said step of determining the current bandwidth comprises:

using a minimum bandwidth within allowed bandwidth on the receiving frequency point as the current bandwidth; or determining the current bandwidth according to the reference signal energy of the first transmitting antenna port, which is specifically: determining a maximum value max($\overline{R}_p^{M_i}$) of $\overline{R}_p^{M_i}$ of the first transmitting antenna port, and using a bandwidth corresponding to the max($\overline{R}_p^{M_i}$) as the current bandwidth.

Furthermore, said step of determining the number of transmitting antenna ports comprises:

in the current bandwidth, comparing the reference signal energy of the second transmitting antenna port with the reference signal energy of the first transmitting antenna port; and when a ratio between both of the reference signal energy is larger than or equal to a preset threshold, determining that the number of transmitting antenna ports is two or four, and when the ratio between both of the reference signal energy is smaller than the preset threshold, determining that the number of transmitting antenna ports is one.

When determining that the number of transmitting antenna ports is two or four, the method further comprises:

in the current bandwidth, comparing the reference signal energy of the third and fourth transmitting antenna ports with the reference signal energy of the first transmitting antenna port; and when a ratio between both of the reference signal energy is larger than or equal to the preset threshold, determining that the number of transmitting antenna ports is four, and when the ratio between both of the reference signal energy is smaller than the preset threshold, determining that the number of transmitting antenna ports is two.

The present invention further provides a device for detecting a transmitting antenna port configuration in a long term evolution system, comprising:

a reference signal extraction unit, configured to receive a signal transmitted by a transmitting end, extract reference signals transmitted by each transmitting antenna port and descramble the reference signals;

a power calculation unit, configured to calculate and obtain reference signal energy of each transmitting antenna port, and divide the reference signal energy into a first type of reference signal energy and a second type of reference signal energy;

a bandwidth detection unit, configured to determine a current bandwidth; and an antenna number detection unit, configured to compare the first type of reference signal energy with the second type of reference signal energy in the current bandwidth, and determine the number of transmitting antenna ports according to a comparison result.

Wherein, the first type of reference signal energy is reference signal energy of a first transmitting antenna port; and the second type of reference signal energy comprises: reference signal energy of a second transmitting antenna port, and reference signal energy of a third transmitting antenna port and a fourth transmitting antenna port.

The reference signal extraction unit is further configured to extract a reference signal of a $p^{th}$ transmitting antenna port from a $m^{th}$ sub-carrier on $l^{th}$ OFDM symbol in a $t^{th}$ time slot in a sub-frame, and the reference signal of the $p^{th}$ transmitting antenna port is: $r_{p,t}(l,m)$; wherein, p represents a transmitting antenna port serial index, t is a time slot index, m is a sub-carrier index, l represents the estimated index of OFDM symbol; and the reference signal extraction unit is further configured to generate a local reference signal $rs_{p,t}(l,m)$ according to a cell identity, a symbol, a time slot sequence number and a cyclic prefix mode information and based on the $r_{p,t}(l,m)$, and descramble the local reference signal: $\overline{r}_{p,t}(l,m) = r_{p,t}(l,m) \cdot rs^*_{p,t}(l,m)$; wherein, * represents conjugation.

The power calculation unit is further configured to conjugate multiply the reference signals $\overline{r}_{p,t}(l,m)$ extracted from two time slots in one sub-frame to obtain reference signal energy of the $p^{th}$ transmitting antenna port corresponding to the $m^{th}$ sub-carrier on the $l^{th}$ OFDM symbol in the time slots t and t+1: $R_p(l,m) = \overline{r}_{p,t}(l,m) \cdot \overline{r}_{p,t}(l,m)$;

wherein, for the first transmitting antenna port and the second transmitting antenna port: $m'=m$; and for the third transmitting antenna port and the fourth transmitting antenna port: $m'=(m+3) \mod 6$.

The power calculation unit is further configured to add all $R_p(l,m)$ of the $p^{th}$ transmitting antenna port within an available bandwidth together to obtain $$\sum^{M_i} R_p(l,m);$$

and add the $$\sum^{M_i} R_p(l,m)$$

corresponding to l OFDM symbols in one time slot together and average to obtain an average value $$\overline{R}_p^{M_i} = \left| \frac{\sum^{l} \sum^{M_i} R_p(l,m)}{l \Box M_i} \right|$$

of the reference signal energy of the $p^{th}$ transmitting antenna port, as the reference signal energy of the $p^{th}$ transmitting antenna port;

said $M_i$ ($i=0, 1, \ldots, 5$) is the number of sub-carriers containing the reference signal within the available bandwidth, $M_i=\{12, 30, 50, 100, 150, 200\}$.

The bandwidth detection unit is further configured to use a minimum bandwidth within allowed bandwidth on the receiving frequency point as the current bandwidth; or, determine a maximum value max($\overline{R}_p^{M_i}$) of $\overline{R}_p^{M_i}$ of the first transmitting antenna port, and use a bandwidth corresponding to the max($\overline{R}_p^{M_i}$) as the current bandwidth.

The antenna number detection unit is further configured to compare the reference signal energy of the second transmitting antenna port with the reference signal energy of the first transmitting antenna port in the current bandwidth; and when a ratio between both of the reference signal energy is larger than or equal to a preset threshold, determine that the number of transmitting antenna ports is two or four, and when the ratio between both of the reference signal energy is smaller than the preset threshold, determine that the number of transmitting antenna ports is one.

The antenna number detection unit is further configured to compare the reference signal energy of the third and fourth transmitting antenna ports with the reference signal energy of the first transmitting antenna port when determining that the number of transmitting antenna ports is two or four; and when a ratio between both of the reference signal energy is larger than or equal to a preset threshold, determine that the number of transmitting antenna ports is four, and when the ratio between both of the reference signal energy is smaller than the preset threshold, determine that the number of transmitting antenna ports is two.

In the embodiments of the present invention, the reference signal on the sub-carrier corresponding to each transmitting antenna port (the first, second, third or fourth antenna port) is extracted and descrambled, the reference signal energy is calculated; in the current bandwidth, the reference signal energy of the first transmitting antenna port is compared with the reference signal energy of the second transmitting antenna port, as well as those of the third and fourth transmitting antenna ports respectively, and the number of the antenna ports for transmitting signals at the transmitting end is determined according to the comparison result. Compared with the prior art, the present invention does not need to perform multiple demodulations on P-BCH to obtain the number of transmitting antenna ports, thus improving the performance of cell initial search and reducing the complexity of implementation, which has a certain application value to the terminal.

PREFERRED EMBODIMENTS OF THE PRESENT INVENTION

In order to reduce the complexity of calculation of the receiver in the cell initial search, in embodiments of the present invention, extract and descramble a reference signal on a sub-carrier corresponding to each transmitting antenna port (the first, second, third and fourth antenna ports), and calculate energy of the reference signal; and under the current bandwidth, compare a reference signal energy of the first transmitting antenna port with a reference signal energy of the second transmitting antenna port, as well as reference signal energy of the third and fourth transmitting antenna ports, respectively, and determine the number of the antenna ports for transmitting signals at the transmitting end according to the comparison result.

According to the 3GPP protocol, the reference signals of different transmitting antenna ports are transmitted on different sub-carriers. When there is no signal transmitted on a certain transmitting antenna port, the sub-carrier corresponding to the reference signal of the transmitting antenna port also does not transmit the reference signal. Thus, for a receiving antenna port, the signals received from a corresponding sub-carrier are divided into two types: a reference signal and a non-reference signal. If the signal is the reference signal, it is illustrated that the transmitting antenna port transmits signals, and according to a method of energy calculation of the present invention, the energy of the reference signal will exceed a preset threshold; and if the signal is the non-reference signal, then the energy of the non-reference signal will be very small and not exceed the preset threshold. According to the above characteristic, the embodiments of the present invention can detect the signal energy on the sub-carrier corresponding to the reference signal to determine whether the antenna port transmits the signals.

In the present invention, the reference signal and non-reference signal extracted by the receiving end is called as a reference signal uniformly, and whether the corresponding transmitting antenna port transmits signals is judged by calculating the energy of the reference signal.

Figure 1:
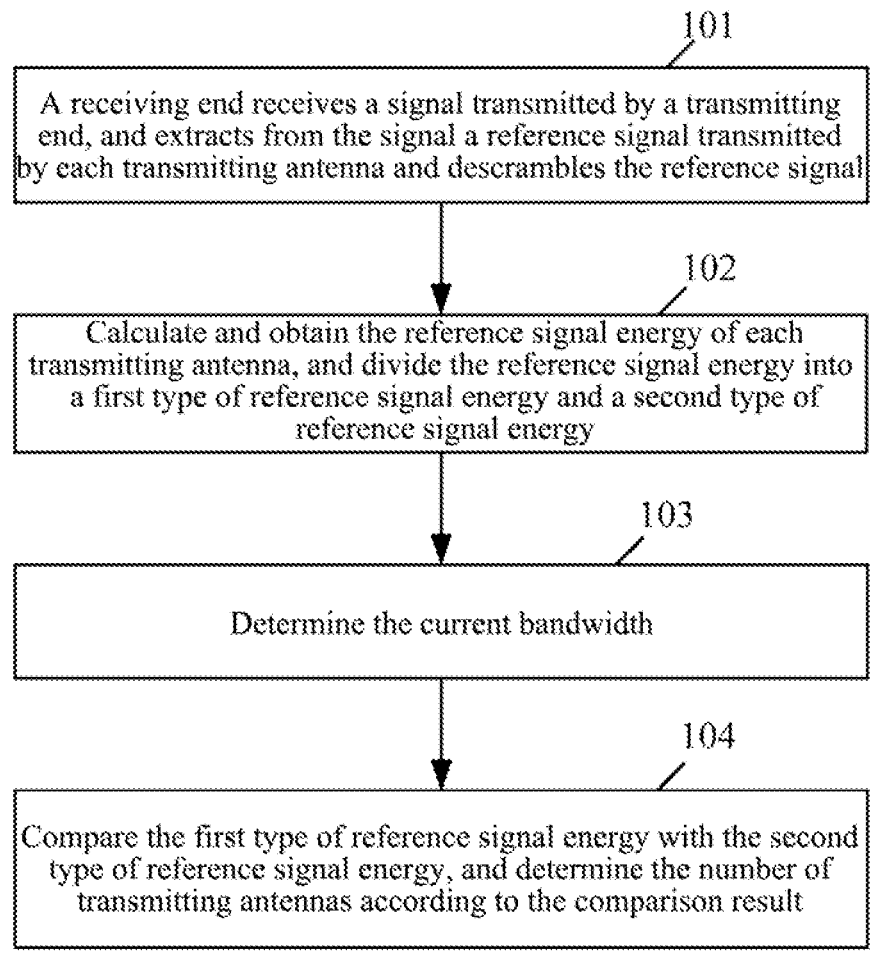
FIG. 1 is a flow chart of a method for detecting a transmitting antenna port configuration in a long term evolution system according to an embodiment of the present invention.

Referring to FIG. 1, a method for detecting a transmitting antenna port configuration in a long term evolution system according to an embodiment of the present invention comprises the following steps.

Step 101: a receiving end receives a signal transmitted by a transmitting end, extracts from the signal a reference signal transmitted by each transmitting antenna port and descrambles the reference signal.

In order to receive the transmitted signals from the transmitting end as entirely as possible, the signals can be received with the maximum possible bandwidth.

The number of the antenna ports of the transmitting end has three possibilities, i.e., one, two or four. The signal transmitted by each transmitting antenna port corresponds to different sub-carrier position at the receiving end. The receiving end (specifically a receiver) can calculate the positions of these sub-carriers according to a cell identity (ID), for example, position 1 for the first transmitting antenna port to transmit the signals is: the $m^{th}$ sub-carrier on $l^{th}$ OFDM symbol in each time slot; position 2 for the second transmitting antenna port to transmit the signals is: the $(m+1)^{th}$ sub-carrier on $l^{th}$ OFDM symbol in each time slot; position 3 for the third and fourth transmitting antenna ports to transmit signals is: the $(m\pm2)^{th}$ sub-carrier on $l^{th}$ OFDM symbol in each time slot, wherein m is the sub-carrier index.

Accordingly, for the receiving end, the received signals are divided into three types in the present invention: signals received from (sub-carrier) position 1, signals received from position 2, and signals received from position 3.

Correspondingly, for the transmitting end, the first transmitting antenna port fixedly transmits signals at position 1, the second transmitting antenna port fixedly transmits signals at position 2, and the third and fourth transmitting antenna ports fixedly transmit signals at position 3.

The receiving end extracts the reference signal from the signal received from a fixed sub-carrier position, thereby obtaining the reference signal transmitted by each antenna port, that is, the reference signal transmitted by the first transmitting antenna port is extracted from the signal received at position 1, the reference signal transmitted by the second transmitting antenna port is extracted from the signal received at position 2, and the reference signals transmitted by the third and fourth transmitting antenna ports are extracted from the signals received at position 3.

It should be pointed out that, during transmitting the signal by the transmitting end, when only one transmitting antenna port is needed, preferably the signal is transmitted at position 1 by using the first transmitting antenna port; when two transmitting antenna ports are needed, preferably the signals are transmitted at position 1 and position 2 respectively by using the first and second transmitting antenna ports; when four transmitting antenna ports are needed, the signals are transmitted at position 1, position 2 and position 3 respectively by using the first, second, third and fourth transmitting antenna ports.

The extracted reference signal generates a local reference signal (scrambler) according to information such as Cell ID, symbol, time slot sequence number and cyclic prefix (CP) mode, and then is descrambled.

Step 102: calculate and obtain the reference signal energy of each transmitting antenna port, and the reference signal energy is divided into a first type of reference signal energy and a second type of reference signal energy.

A sub-frame includes two time slots, and the reference signals at the same position of the two time slots (referring to the sub-carrier with the corresponding number on the same OFDM symbol) are conjugate multiplied, thereby obtaining the reference signal energy of the corresponding transmitting antenna port. The specific implementation will be described in the subsequent embodiment.

In this way, the influence of channel fading and noise can be reduced and eliminated.

In the present invention, the receiving end can calculate and obtain three reference signal energies. The three reference signal energies are: the reference signal energy of the first transmitting antenna port corresponding to position 1 (the first type of reference signal energy), the reference signal energy of the second transmitting antenna port corresponding to position 2 (the second type of reference signal energy), and the reference signal energy of the third and fourth transmitting antenna ports corresponding to position 3 (the second type of reference signal energy).

Here, an average energy of the reference signals of all the transmitting antenna port within the available bandwidth can be calculated, and the average energy is used as the reference signal energy.

Step 103: determine the current bandwidth.

Here, the minimum possible bandwidth in the bandwidth range on the setting receiving frequency point can be used as the current bandwidth, i.e., 1.4M, or the current bandwidth can be determined according to the reference signal energy of the first transmitting antenna port. The specific implementation will be described with reference to the subsequent embodiment.

Step 104: the first type of reference signal energy is compared with the second type of reference signal energy in the current-bandwidth, and the number of transmitting antenna ports of the transmitting end is determined according to the comparison result.

The process of determining the number of transmitting antenna ports of the transmitting end is as follows:

in the current bandwidth, the reference signal energy of the second transmitting antenna port is compared with the reference signal energy of the first transmitting antenna port, and if the ratio of the former to the latter is larger than or equal to the setting threshold, it is determined that the number of the transmitting antenna ports is two or four; otherwise, it is determined that the number of the transmitting antenna ports is one;

when it is determined that the number of the transmitting antenna ports is two or four, the reference signal energy of the third and fourth transmitting antenna ports are further compared with the reference signal energy of the first transmitting antenna port, and if the ratio of the former to the latter is larger than or equal to the setting threshold, it is determined that the number of the transmitting antenna ports is four; otherwise, it is determined that the number of the transmitting antenna ports must be two.

The number of the transmitting antenna ports is four at most, for example, the first, second, third and fourth transmitting antenna ports are indicated with p0, p1, p2 and p3 respectively. The reference signals transmitted on the four transmitting antenna ports correspond to different sub-carrier positions at the receiving end, i.e., p0 corresponds to position 1, p1 corresponds to position 2, and p2 and p3 correspond to position 3. The receiver can calculate these sub-carrier positions according to Cell ID of the cell. Wherein, the reference signal exists in the sub-carrier corresponding to position 1; if there are two transmitting antenna ports, then the reference signals exist in the sub-carriers corresponding to both position 1 and position 2; if there are four transmitting antenna ports, then the reference signals exist in the sub-carriers corresponding to position 1, position 2 and position 3. Therefore, it is certain that the reference signal exists in the sub-carrier corresponding to position 1.

At the receiving end, the reference signals on the sub-carriers corresponding to position 1, position 2 and position 3 are extracted respectively, and the reference signal energy of p0, the reference signal energy of p1 and the reference signal energy of p2 and p3 are calculated and obtained;

the current bandwidth is determined according to the reference signal energy of the transmitting antenna port p0; or, the minimum possible bandwidth in the bandwidth range on the setting receiving frequency point is used as the current bandwidth, i.e., 1.4M;

the reference signal energy of the transmitting antenna port p0 in the current bandwidth is compared with the reference signal energy of p1 and/or the reference signal energy value of p2 and p3, and the number of antenna ports for transmitting the signals at the transmitting end is determined according to the comparison result.

The process of detecting a transmitting antenna port configuration in an evolution system according to the present invention will be described in detail below with reference to the specific embodiment.

Figure 2:
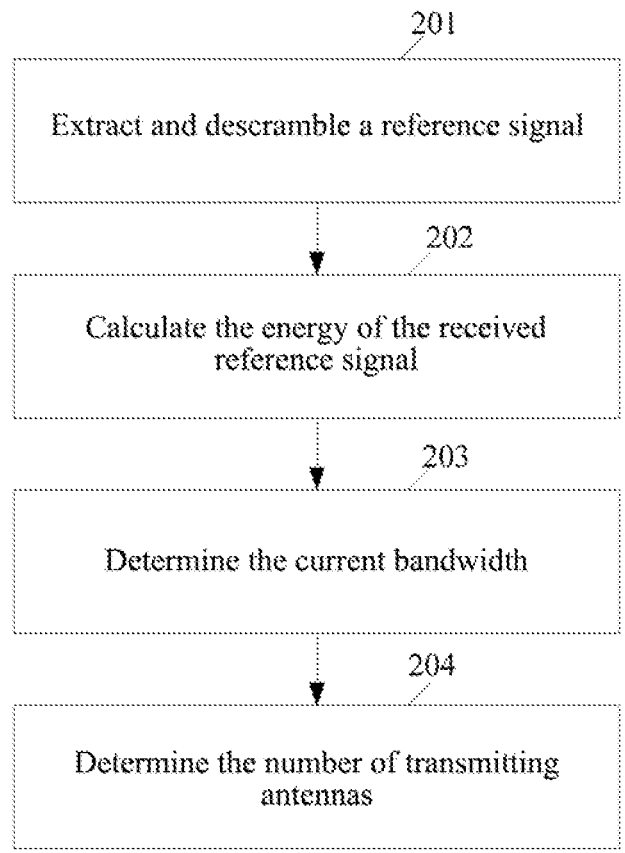
FIG. 2 is a flow chart of a method for detecting a transmitting antenna port configuration in a long term evolution system according to another embodiment of the present invention.

Referring to FIG. 2, the detecting method according to the embodiment of the present invention specifically comprises the following steps.

Step 201: extract and descramble a reference signal.

The sub-carrier position corresponding to the reference signal is determined by the information including Cell ID of the cell, symbol, time slot sequence number and CP mode (refer to 3GPP specifications 36.211).

Suppose that the reference signal of the $p^{th}$ transmitting antenna port, which corresponds to the $m^{th}$ sub-carrier on $l^{th}$ OFDM symbol in the $i^{th}$ time slot in one sub-frame is $r_{p,t}(l,m)$; wherein, p represents the transmitting antenna port index (0, 1, 2, 3), t is the time slot index, m is the sub-carrier index, l represents the estimated index of OFDM symbol, where the OFDM symbol may be OFDM symbol containing reference signals in one or more downlink sub-frames. Since one sub-frame only contain two time slots, preferably, the value of t is 0 or 1.

Then a local reference signal $rs_{p,t}(l,m)$ is generated according to information such as the Cell ID of the cell, the symbol, time slot sequence number and CP mode, and is descrambled, i.e., $\bar{r}_{p,t}(l,m) = r_{p,t}(l,m) \cdot rs^*_{p,t}(l,m)$; wherein, * indicates conjugation.

Step 202: calculate the energy of the received reference signal.

Since a sub-frame includes two time slots, the descrambled reference signals $\bar{r}_{p,t}(l,m)$ at the same position in the two time slots are conjugate multiplied, obtaining $R_p(l,m)=\bar{r}_{p,t}(l,m)\cdot \bar{r}^*_{p,t+1}(l,m')$; wherein, $R_p(l,m)$ is the reference signal energy of the $p^{th}$ transmitting antenna port corresponding to the $m^{th}$ sub-carrier on the $l^{th}$ OFDM symbol in time slots t and t+1. For the first and second transmitting antenna ports, m'=m; for the third and fourth transmitting antenna ports, m'=(m+3) mod 6.

Furthermore, in the present invention, an average value of $R_p(l,m)$ of the $p^{th}$ transmitting antenna port within the available bandwidth is calculated, and this average value is used as the reference signal energy of the $p^{th}$ transmitting antenna port. Specifically, all $R_p(l,m)$ of the $p^{th}$ transmitting antenna port within the available bandwidth are added together, i.e., $$\sum_{}^{M_i} R_p(l,m)$$

then, the $$\sum_{}^{M_i} R_p(l,m),$$

corresponding to l symbols in a time slot are added and averaged, obtaining an average value of the reference signal energy of the $p^{th}$ transmitting antenna port:

$$\bar{R}_p^{M_i} = \left| \frac{\sum^{l}\sum^{M_i} R_p(l,m)}{l \square M_i} \right|;$$

wherein, $M_i$ (i=0, 1, ..., 5) represents the number of sub-carriers containing reference signals within the available bandwidth, $M_i$={12, 30, 50, 100, 150, 200} corresponds to bandwidths of 1.4M, 3M, 5M, 10M, 15M and 20M respectively. In a case of multiple receiving antenna ports, all $\bar{R}_p^{M_i}$ of the receiving antenna ports can be added to improve the performance of detection.

Accordingly, six reference signal energies can be obtained for each transmitting antenna port, i.e., $\bar{R}_p^{M_i}=\{\bar{R}_p^{M_0},\bar{R}_p^{M_1},\bar{R}_p^{M_2},\bar{R}_p^{M_3},\bar{R}_p^{M_4},\bar{R}_p^{M_5}\}$;

Finally, three groups of $\bar{R}_p^{M_i}$, i.e., $\bar{R}_p^{M_i}=\{\bar{R}_0^{M_i}, \bar{R}_1^{M_i}, \bar{R}_{2,3}^{M_i}\}$, of the first transmitting antenna port, the second transmitting antenna port, and the third and fourth transmitting antenna ports can be obtained by calculating, and then the following reference signal energy matrix can be obtained:

$$\bar{R}_p^{M_i} = \begin{Bmatrix} \bar{R}_0^{M_0}, \bar{R}_0^{M_1}, \bar{R}_0^{M_2}, \bar{R}_0^{M_3}, \bar{R}_0^{M_4}, \bar{R}_0^{M_5} \\ \bar{R}_1^{M_0}, \bar{R}_1^{M_1}, \bar{R}_1^{M_2}, \bar{R}_1^{M_3}, \bar{R}_1^{M_4}, \bar{R}_1^{M_5} \\ \bar{R}_{2,3}^{M_0}, \bar{R}_{2,3}^{M_1}, \bar{R}_{2,3}^{M_2}, \bar{R}_{2,3}^{M_3}, \bar{R}_{2,3}^{M_4}, \bar{R}_{2,3}^{M_5} \end{Bmatrix}.$$

The above data will be used to perform bandwidth detection and antenna port number detection below.

Step 203: determine the current bandwidth.

The reference signal energy of the first transmitting antenna port 0 is used to perform bandwidth detection: the bandwidth corresponding to the $\bar{R}_0^{M_i}$ with the maximum energy, i.e., max($\bar{R}_0^{M_i}$), is used as the current bandwidth, and the bandwidths corresponding to $\bar{R}_0^{M_0}$, $\bar{R}_0^{M_1}$, $\bar{R}_0^{M_2}$, $\bar{R}_0^{M_3}$, $\bar{R}_0^{M_4}$, $\bar{R}_0^{M_5}$ are 1.4M, 3M, 5M, 10M, 15M and 20M respectively;

or, a minimum possible bandwidth within the range of the bandwidth on the setting receiving frequency point can also be used as the current bandwidth, for example, 1.4M, 5 MHz, etc., which is determined according to the 3GPP specifications.

Step 204: determine the number of transmitting antenna ports.

After the current bandwidth is determined, the $\bar{R}_0^{M_i}$ corresponding to the current bandwidth is used as the reference signal energy of the first transmitting antenna port 0; the $\bar{R}_1^{M_i}$ corresponding to the current bandwidth is used as the reference signal energy of the second transmitting antenna port 1; the $\bar{R}_{2,3}^{M_i}$ corresponding to the current bandwidth is used as the reference signal energy of the third and fourth transmitting antenna ports 2 and 3.

Firstly, $\bar{R}_1^{M_i}$ and $\bar{R}_0^{M_i}$ in the current bandwidth are compared; if $\bar{R}_1^{M_i}/\bar{R}_0^{M_i} \geq R_{thr}$ ($R_{thr}$ is the setting threshold), then it is believed that the second transmitting antenna port 1 corresponding to $\bar{R}_1^{M_i}$ transmits the signals, and it is determined that two or four transmitting antenna ports exist in the transmitting end; and if $\bar{R}_1^{M_i}/\bar{R}_0^{M_i} < R_{thr}$, it is believed that the second transmitting antenna port 1 corresponding to $\bar{R}_1^{M_i}$ does not transmit the signals, and meanwhile, the third and fourth transmitting antenna ports also do not transmit the signals, i.e., it is determined that two transmitting antenna ports exist in the transmitting end;

when it is determined that two or four transmitting antenna ports exist in the transmitting end, $\bar{R}_{2,3}^{M_i}$ and $\bar{R}_0^{M_i}$ are further compared. If $\bar{R}_{2,3}^{M_i}/\bar{R}_0^{M_i} \geq R_{thr}$, it is believed that the third and fourth transmitting antenna ports 2 and 3 corresponding to $\bar{R}_{2,3}^{M_i}$ transmit the signals, and it is determined that four transmitting antenna ports exist in the transmitting end; if $\bar{R}_{2,3}^{M_i}/\bar{R}_0^{M_i} < R_{thr}$, it is determined that two transmitting antenna ports exist in the transmitting end.

It should be pointed out that: if the bandwidth detection is not performed according to the first transmitting antenna port, the antenna port number detection can be still performed; but since the current bandwidth is unknown, only the minimum possible bandwidth is used as the current bandwidth, which will reduce the accuracy of the antenna port number detection.

Figure 3:
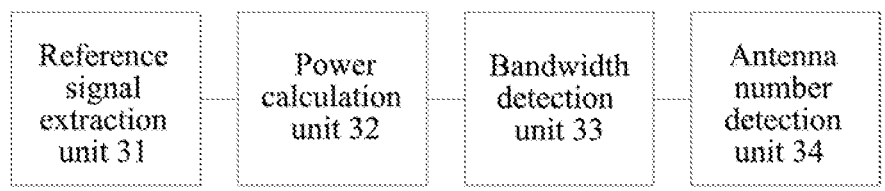
FIG. 3 is a structural diagram of a device for detecting a transmitting antenna port configuration in a long term evolution system according to an embodiment of the present invention.

Referring to FIG. 3, a device for detecting a transmitting antenna port configuration in a long term evolution system according to an embodiment of the present invention, comprises: a reference signal extraction unit 31, a power calculation unit 32, a bandwidth detection unit 33 and an antenna number detection unit 34, wherein:

the reference signal extraction unit 31 is used to receive a signal transmitted by a transmitting end, extract from the signal a reference signal transmitted by each transmitting antenna port and descramble the reference signal;

the power calculation unit 32 is used to calculate and obtain reference signal energy of each transmitting antenna port, and divide the reference signal energy into a first type of reference signal energy and a second type of reference signal energy;

the bandwidth detection unit 33 is used to determine a current bandwidth;

the antenna number detection unit 34 is used to compare the first type of reference signal energy with the second type of reference signal energy in the current bandwidth, and determine the number of transmitting antenna ports according to a comparison result.

Wherein, the first type of reference signal energy is reference signal energy of a first transmitting antenna port; the second type of reference signal energy includes: reference signal energy of a second transmitting antenna port, and reference signal energy of a third transmitting antenna port and a fourth transmitting antenna port.

Wherein, the reference signal extraction unit 31 is further used to extract a reference signal, $r_{p,t}(l,m)$, of a $p^{th}$ transmitting antenna port from a $m^{th}$ sub-carrier on $l^{th}$ OFDM symbol in a $t^{th}$ time slot in a sub-frame; wherein, p represents a transmitting antenna port index, t is a time slot index, m is a sub-carrier index, l represents the estimated index of OFDM symbol.

The reference signal extraction unit 31 is further used to generate a local reference signal $rs_{p,t}(l,m)$ according to a cell identity (Cell ID) and index (cyclic prefix, CP) mode information and based on the $r_{p,t}(l,m)$, and descramble the local reference signal: $\bar{r}_{p,t}(l,m) = r_{p,t}(l,m) \cdot rs^*_{p,t}(l,m)$; wherein, * represents conjugation, m'=m for the first and second transmitting antenna ports, and m'=(m+3) mod 6 for the third and fourth transmitting antenna ports.

The power calculation unit 32 is further used to conjugate multiply the reference signals $\bar{r}_{p,t}(l,m)$ extracted from two time slots in one sub-frame to obtain reference signal energy of the $p^{th}$ transmitting antenna port corresponding to the $m^{th}$ sub-carrier on the $l^{th}$ OFDM symbol in time slots t and t+1:

$$R_p(l,m) = \bar{r}_{p,t}(l,m) \cdot \bar{r}^*_{p,t+1}(l,m').$$

For the transmitting antenna ports 0 and 1, m'=m, and for the transmitting antenna ports 2 and 3, m'=(m+3) mod 6. The power calculation unit 32 is further used to add all $R_p(l,m)$ of the $p^{th}$ transmitting antenna port within the available bandwidth together to obtain $$\sum_{}^{M_i} R_p(l,m);$$

add the $$\sum_{}^{M_i} R_p(l,m)$$

corresponding to l OFDM symbols in one time slot together and average to obtain an average value of the $$\bar{R}_p^{M_i} = \left| \frac{\sum^l \sum^{M_i} R_p(l,m)}{l \square M_i} \right|$$

of the reference signal energy of the $p^{th}$ transmitting antenna port, as the reference signal energy of the $p^{th}$ transmitting antenna port; in a case of multiple receiving antenna ports, $\bar{R}_p^{M_i}$ of all the receiving antenna ports can be added to improve the performance of detection.

$M_i$ (i=0, 1, ..., 5) is the number of sub-carriers containing reference signals within the available bandwidth, $M_i \{12, 30, 50, 100, 150, 200\}$.

The bandwidth detection unit 33 is further used to use a minimum possible bandwidth within the range of the bandwidth on a setting receiving frequency point as the current bandwidth; or, determine a maximum value $\max(\bar{R}_p^{M_i})$ of $\bar{R}_p^{M_i}$ of the first transmitting antenna port, and use a bandwidth corresponding to the $\max(\bar{R}_p^{M_i})$ as the current bandwidth.

The antenna number detection unit 34 is further used to compare the reference signal energy of the second transmitting antenna port with the reference signal energy of the first transmitting antenna port in the current bandwidth, and when a ratio between both of them is larger than or equal to a preset threshold, determine that the number of transmitting antenna ports is two or four; and when the ratio between both of them is smaller than the preset threshold, determine that the number of transmitting antenna ports is one.

The antenna number detection unit 34 is further used to compare the reference signal energy of the third and fourth transmitting antenna ports with the reference signal energy of the first transmitting antenna port in the current bandwidth when it is determined that the number of transmitting antenna ports is two or four, and when a ratio between both of them is larger than or equal to the preset threshold, determine that the number of transmitting antenna ports is four; when the ratio between both of them is smaller than the preset threshold, determine that the number of transmitting antenna ports is two.

The detection method and device of a blind joint detection method of the number of transmitting antenna ports and bandwidth provided in the embodiments of the present invention, can detect the bandwidth of the system and the number of transmitting antenna ports at the same time, and compared with the prior art, the present invention does not need to perform multiple demodulations on P-BCH to obtain the number of transmitting antenna ports, thus improving the performance of cell initial search and reducing the complexity of implementation, which has a certain application value to the terminal.

Obviously, a person having ordinary skill in the art can make various modifications and variations on the present invention without departing from the spirit and scope of the present invention. Thus, if these modifications and variations on the present invention fall into the scope of the appending claims of the present invention and the equivalent technology thereof, then the present invention is also intended to include these modifications and variations.

What is claimed is:

1. A method for detecting a transmitting antenna port configuration in a long term evolution system, comprising the following steps of:
   receiving a signal transmitted by a transmitting end at a receiving end, extracting from the signal preference signals transmitted by each transmitting antenna port of the transmitting end and descrambling the reference signals;
   calculating and obtaining reference signal energy of the each transmitting antenna port, dividing the reference signal energy into a first type of reference signal energy and a second type of reference signal energy, and determining a current bandwidth; and
   comparing the first type of reference signal energy with the second type of reference signal energy in the current bandwidth, and determining the number of transmitting antenna ports according to a comparison result.

2. The method according to claim 1, wherein, the receiving end receives the signal transmitted by the transmitting end with a maximum possible bandwidth.

3. The method according to claim 1, wherein, the first type of reference signal energy is reference signal energy of a first transmitting antenna port; and
   the second type of reference signal energy comprises: reference signal energy of a second transmitting antenna port, and reference signal energy of a third transmitting antenna port and a fourth transmitting antenna port.

4. The method according to claim 3, wherein, said step of the receiving end extracting the reference signals transmitted by each transmitting antenna port from the received signal comprises:

the receiving end extracting a reference signal of a $p^{th}$ transmitting antenna port from a $m^{th}$ sub-carrier on $l^{th}$ OFDM symbol in a $t^{th}$ time slot in a sub-frame, and the reference signal of the $p^{th}$ transmitting antenna port is $r_{p,t}(l,m)$;

wherein, p represents a transmitting antenna port index, t is a time slot index, m is a sub-carrier index, l represents the estimated index of OFDM symbol; and said step of descrambling the extracted reference signal comprises: generating a local reference signal $rs_{p,t}(l,m)$ according to a cell identity, a symbol, a time slot sequence number and a cyclic prefix mode information and based on the $r_{p,t}(l,m)$, and descrambling:

$$\bar{r}_{p,t}(l,m) = r_{p,t}(l,m) rs^*_{p,t}(l,m).$$

5. The method according to claim 4, wherein, said step of calculating and obtaining the reference signal energy of each transmitting antenna port comprises:

conjugate multiplying the descrambled reference signals $\bar{r}_{p,t}(l,m)$ extracted from two time slots in one sub-frame to obtain reference signal energy of the $p^{th}$ transmitting antenna port corresponding to the $m^{th}$ sub-carrier on the $l^{th}$ OFDM symbol in the time slots t and t+1:

$$R_P(l,m) = \bar{r}_{p,t}(l,m) \bar{r}^*_{p,t+1}(l,m')$$

wherein, for the first transmitting antenna port and the second transmitting antenna port: m'=m; and for the third transmitting antenna port and the fourth transmitting antenna port: m=(m 3) mod 6.

6. The method according to claim 5, further comprising:
adding all $R_P(l,m)$ of the $p^{th}$ transmitting antenna port within an available bandwidth together to obtain $$\sum^{M_i} R_p(l,m);$$

adding the $$\sum^{M_i} R_p(l,m)$$

corresponding to l OFDM symbols in one time slot together and averaging to obtain an average value $$\bar{R}_p^{M_i} = \left| \frac{\sum^l \sum^{M_i} R_p(l,m)}{l \Box M_i} \right|$$

of the reference signal energy of the $p^{th}$ transmitting antenna port, as the reference signal energy of the $p^{th}$ transmitting antenna port;

said $M_i$ (i=0, 1, . . . , 5) is the number of sub-carriers containing the reference signal within the available bandwidth, $M_i$={12, 30, 50, 100, 150, 200}.

7. The method according to claim 6, wherein, said step of determining the current bandwidth comprises:

using a minimum bandwidth within allowed bandwidth on the receiving frequency point as the current bandwidth; or determining the current bandwidth according to the reference signal energy of the first transmitting antenna port, which is specifically: determining a maximum value $\max(\bar{R}_p^{M_i})$ of $\bar{R}_p^{M_i}$ of the first transmitting antenna port, and using a bandwidth corresponding to the $\max(\bar{R}_p^{M_i})$ as the current bandwidth.

8. The method according to claim 7, wherein, said step of determining the number of transmitting antenna ports comprises:

in the current bandwidth, comparing the reference signal energy of the second transmitting antenna port with the reference signal energy of the first transmitting antenna port; and when a ratio between both of the reference signal energy is larger than or equal to a preset threshold, determining that the number of transmitting antenna ports is two or four, and when the ratio between both of the reference signal energy is smaller than the preset threshold, determining that the number of transmitting antenna port is one.

9. The method according to claim 8, wherein, when determining that the number of transmitting antenna ports is two or four, the method further comprises:

in the current bandwidth, comparing the reference signal energy of the third and fourth transmitting antenna ports with the reference signal energy of the first transmitting antenna port; and when a ratio between both of the reference signal energy is larger than or equal to the preset threshold, determining that the number of transmitting antenna ports is four, and when the ratio between both of the reference signal energy is smaller than the preset threshold, determining that the number of transmitting antenna ports is two.

10. A device for detecting a transmitting antenna port configuration in a long term evolution system, comprising:

a reference signal extraction unit, configured to receive a signal transmitted by a transmitting end, extract from the signal reference signals transmitted by each transmitting antenna port of the transmitting end and descramble the reference signals;

a power calculation unit, configured to calculate and obtain reference signal energy of the each transmitting antenna port, and divide the reference signal energy into a first type of reference signal energy and a second type of reference signal energy;

a bandwidth detection unit, configured to determine a current bandwidth; and an antenna number detection unit, configured to compare the first type of reference signal energy with the second type of reference signal energy in the current bandwidth, and determine the number of transmitting antenna ports according to a comparison result.

11. The device according to claim 10, wherein,
the first type of reference signal energy is reference signal energy of a first transmitting antenna port; and
the second type of reference signal energy comprises: reference signal energy of a second transmitting antenna port, and reference signal energy of a third transmitting antenna port and a fourth transmitting antenna port.

12. The device according to claim 11, wherein,
the reference signal extraction unit is further configured to extract a reference signal of a $p^{th}$ transmitting antenna port from a $m^{th}$ sub-carrier on $l^{th}$ OFDM symbol in a $t^{th}$ time slot in a sub-frame, and the reference signal of the $p^{th}$ transmitting antenna port is: $r_{p,t}(l,m)$; wherein, p represents a transmitting antenna port index, t is a time slot index, m is a sub-carrier index, l represents the estimated index of OFDM symbol; and the reference signal extraction unit is further configured to generate a local reference signal $rs_{p,t}(l,m)$ according to a cell identity, a symbol, a time slot sequence number and a cyclic prefix mode information and based on the $r_{p,t}(l,m)$, and descramble the local reference signal: $\bar{r}_{p,t}(l,m) = r_{p,t}(l,m) \, rs^*_{p,t}(l,m)$; wherein, * represents conjugation.

13. The device according to claim 12, wherein, the power calculation unit is further configured to conjugate multiply the reference signals $\bar{r}_{p,t}(l,m)$ extracted from two time slots in one sub-frame to obtain reference signal energy of the $p^{th}$ transmitting antenna port corresponding to the $m^{th}$ sub-carrier on the $l^{th}$ OFDM symbol in the time slots t and t+1: $R_p(l,m) = \bar{r}_{p,t}(l,m)\bar{r}^*_{p,t+1}(l,m')$;

wherein, for the first transmitting antenna port and the second transmitting antenna port: m'=m; and for the third transmitting antenna port and the fourth transmitting antenna port: m'=(m 3) mod 6.

14. The device according to claim 13, wherein, the power calculation unit is further configured to add all $R_p(l,m)$ of the $p^{th}$ transmitting antenna port within an available bandwidth together to obtain $$\sum^{M_i} R_p(l,m);$$

and add the $$\sum^{M_i} R_p(l,m)$$

corresponding to l OFDM symbols in one time slot together and average to obtain an average value $$\bar{R}_p^{M_i} = \left| \frac{\sum^l \sum^{M_i} R_p(l,m)}{l \Box M_i} \right|$$

of the reference signal energy of the $p^{th}$ transmitting antenna port, as the reference signal energy of the $p^{th}$ transmitting antenna port;

said $M_i$ (i=0, 1, . . . , 5) is the number of sub-carriers containing the reference signal within the available bandwidth, $M_i$={12, 30, 50, 100, 150, 200}.

15. The device according to claim 14, wherein, the bandwidth detection unit is further configured to use a minimum bandwidth within allowed bandwidth on the receiving frequency point as the current bandwidth; or, determine a maximum value $\max(\bar{R}_p^{M_i})$ of $\bar{R}_p^{M_i}$ of the first transmitting antenna port, and use a bandwidth corresponding to the $\max(\bar{R}_p^{M_i})$ as the current bandwidth.

16. The device according to claim 15, wherein, the antenna number detection unit is further configured to compare the reference signal energy of the second transmitting antenna port with the reference signal energy of the first transmitting antenna port in the current bandwidth; and when a ratio between both of the reference signal energy is larger than or equal to a preset threshold, determine that the number of transmitting antenna ports is two or four, and when the ratio between both of the reference signal energy is smaller than the preset threshold, determine that the number of transmitting antenna port is one.

17. The device according to claim 16, wherein, the antenna number detection unit is further configured to compare the reference signal energy of the third and fourth transmitting antenna ports with the reference signal energy of the first transmitting antenna port when determining that the number of transmitting antenna ports is two or four; and when a ratio between both of the reference signal energy is larger than or equal to a preset threshold, determine that the number of transmitting antenna ports is four, and when the ratio between both of the reference signal energy is smaller than the preset threshold, determine that the number of transmitting antenna ports is two.

18. The method according to claim 2, wherein, the first type of reference signal energy is reference signal energy of a first transmitting antenna port; and the second type of reference signal energy comprises: reference signal energy of a second transmitting antenna port, and reference signal energy of a third transmitting antenna port and a fourth transmitting antenna port.

* * * * *